(12) United States Patent
Yatake

(10) Patent No.: US 7,678,846 B2
(45) Date of Patent: Mar. 16, 2010

(54) INK-JET RECORDING INK

(75) Inventor: Masahiro Yatake, Shiojjri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/001,522

(22) Filed: Dec. 12, 2007

(65) Prior Publication Data

US 2008/0146727 A1    Jun. 19, 2008

(30) Foreign Application Priority Data

Dec. 14, 2006  (JP) .............................. 2006-336675

(51) Int. Cl.
    *C09D 11/00*    (2006.01)
(52) U.S. Cl. ................. 523/160; 524/366; 524/556; 106/31.6
(58) Field of Classification Search .................. None
    See application file for complete search history.

(56) References Cited

U.S. PATENT DOCUMENTS

| 5,221,334 | A  |   | 6/1993  | Ma et al. |            |
|-----------|----|---|---------|-----------|------------|
| 6,670,409 | B2 | * | 12/2003 | Yatake    | 523/160    |
| 6,802,893 | B1 | * | 10/2004 | Komatsu et al. | 106/31.6 |
| 6,830,612 | B1 | * | 12/2004 | Yatake et al. | 106/31.58 |
| 2003/0078320 | A1 | * | 4/2003 | Yatake | 523/160 |
| 2003/0106462 | A1 | * | 6/2003 | Yatake et al. | 106/31.59 |
| 2004/0077749 | A1 | * | 4/2004 | Yatake | 523/160 |
| 2006/0016370 | A1 | * | 1/2006 | Yatake | 106/31.58 |
| 2008/0146712 | A1 | * | 6/2008 | Yatake | 524/376 |

FOREIGN PATENT DOCUMENTS

| JP | 01-301760     | 12/1989 |
| JP | 5-179183      | 7/1993  |
| JP | 10-140065     | 5/1998  |
| JP | 2005-171223   | 6/2005  |
| WO | WO-01/96483 A1 | 12/2001 |

OTHER PUBLICATIONS

Surfynol 465 Data Sheet.*

* cited by examiner

*Primary Examiner*—David Wu
*Assistant Examiner*—Vu Nguyen
(74) *Attorney, Agent, or Firm*—Nutter McClennen & Fish LLP; John J. Penny, Jr.; Giordana M. Belenchia-Sauer

(57) ABSTRACT

An inkjet recording ink comprising water, a pigment dispersed using a polymer having an acid value of at least 50 mg KOH/g but not more than 200 mg KOH/g and a weight-average molecular weight of at least 20,000 but not more than 120,000, along with an alkyl alcohol polyoxypropylene and polyoxyethylene addition product with 8 to 16 carbon atoms.

7 Claims, No Drawings

INK-JET RECORDING INK

The entire disclosure of Japanese Patent Application No. 2006-336675 filed on Dec. 14, 2006 is expressly incorporated by reference herein.

BACKGROUND

1. Technical Field

The present invention relates to an inkjet recording ink excellent in storage stability and discharge stability and also having strong color development on plain paper and glossy paper as well as high glossiness on glossy paper.

2. Related Art

Existing inkjet recording inks commonly use dyes as the coloring material, but those using pigments are becoming more popular. In the case of inks using pigments, methods that have been examined for dispersing the pigments in water include methods using surfactants (JP-A-1-301760), methods of dispersal using a dispersion polymer having a hydrophobic part and a hydrophilic part (JP-B-5-064724), and methods in which the surface of the pigment is coated with a polymer, such as for example methods using phase-inversion emulsification or acid precipitation (JP-A-10-140065).

SUMMARY

However, because a polymer having styrene as a principal component was used for dispersing the pigment in all cases, fixation was poor and the printed matter tended to turn yellow during long-term storage. Moreover, under normal circumstances if a surfactant, glycol ether or other substance having a hydrophilic part and a hydrophobic part is present in the ink the polymer becomes more liable to adsorption and desorption, thus degrading the storage stability of the ink. With existing aqueous ink, a surfactant, glycol ether or other substance having a hydrophilic part and a hydrophobic part is required in order to reduce blurring of the ink on paper. Inks that lack such substances do not permeate the paper sufficiently, the types of papers on which uniform printing can be performed are limited, and the printed image tends to degrade.

The problem with adding an additive for improving printing quality (acetylene glycol, acetylene alcohol, silicon-based surfactant, di(tri)ethylene glycol monobutyl ether or 1,2-alkylene glycol or a mixture of these) for example to an existing pigment dispersion is that long-term storage stability cannot be obtained, and in the case of a pigment ink, because of its poor redissolution properties the ink tends to clog the nozzle of the inkjet head upon drying and attack the adhesives and other materials used to make up the head, thereby detracting from adhesive strength and discharge stability.

Other problems that have occurred when pigments are dispersed in such a common dispersants are that dispersant residue remains in the ink system or the dispersant becomes separated from the pigment without contributing sufficiently to dispersal, resulting in increased viscosity. Increased viscosity restricts the amount of pigment other coloring material that can be added, and adequate printing quality may not be obtained, especially on plain paper.

An inkjet recording ink according to an aspect of the invention contains water, a pigment dispersed using a polymer having an acid value of at least 50 mg KOH/g but not more than 200 mg KOH/g and a weight-average molecular weight of at least 20,000 but not more than 120,000, along with an alkyl alcohol polyoxypropylene and polyoxyethylene addition product with 8 to 16 carbon atoms.

An inkjet recording ink according to an aspect of the invention has the effect of providing an inkjet recording ink excellent in storage stability and discharge stability and also having strong color development on plain paper and glossy paper and high glossiness on glossy paper.

DESCRIPTION OF EXEMPLARY EMBODIMENTS

Embodiments of the present invention are explained next. The following embodiments are examples for explaining the present invention and are not intended to limit the present invention. The present invention can be embodied in various other ways as long as the essence of the invention is not violated.

An inkjet recording ink according to an aspect of the invention is the result of exhaustive research in light of demand for such properties as excellent storage stability and discharge stability, strong color development on plain paper and glossy paper, adequate glossiness and fixation on glossy paper and excellent discharge stability of the ink from the inkjet head.

The inkjet recording ink contains water, a pigment dispersed using a polymer with an acid value of at least 50 mg KOG/g but not more than 200 mg KOG/g and a weight-average molecular weight of at least 20,000 but not more than 120,000, along with an alkyl alcohol polyoxypropylene and polyoxyethylene addition product with 8 to 16 carbon atoms. If the acid value is below 50 mg KOG/g dispersion stability will not be obtained, while if it exceeds 200 mg KOG/g color development on plain paper will decline. If the weight-average molecular weight is less than 20,000 the long-term storage stability, thermal stability and fixation of the inkjet ink will be adversely affected, while if it exceeds 120,000 the inkjet ink will be more viscous, tending to detract from dispersion stability as well as from discharge stability. Moreover, if the alkyl alcohol polyoxypropylene and polyoxyethylene addition product has fewer than 8 carbon atoms glossiness will be less on glossy paper, while if it has more than 16 the ink will be more viscous and discharge stability will not be obtained.

According to another aspect of the invention, the monomers forming the dispersion polymer are preferably polymerized with 15 wt % or less of (meth)acrylic acid, and this is because above 15 wt % the color development of the inkjet ink on plain paper tends to be less, but polymerization with amounts exceeding 15 wt % is not excluded, and a more desirable range is 10 wt % or less. Comparing methacrylic acid and acrylic acid, moreover, acrylic acid is preferred from the standpoint of fixation.

The alkyl alcohol polyoxypropylene and polyoxyethylene addition product with 8 to 16 carbon atoms preferably has a molecular weight of at least 400 because below 400 a high gloss is more difficult to obtain on glossy paper. Glossiness on glossy paper is further improved if the added amount of polyoxypropylene is greater than the added amount of polyoxyethylene.

The propyleneoxy and ethyleneoxy groups may be added to the alkyl alcohol either randomly or as blocks, but a structure produced by first adding the propyleneoxy groups as blocks to the alkyl group and then adding the ethyleneoxy groups as blocks provides better glossiness on glossy paper and better color development on plain paper than random addition or addition of the ethyleneoxy groups as blocks followed by addition of the ethyleneoxy groups as blocks to the alkyl group.

The amount of the $C_{8-16}$ alkyl alcohol polyoxypropylene and polyoxyethylene addition product that is added to the ink is preferably at least 0.01 wt % but not more than 5 wt %, because below 0.01 wt % there will be little improvement in gloss on glossy paper, while above 5 wt % the ink will become more viscous, detracting from discharge stability. At least 0.1 wt % but less than 2 wt % is more desirable, and at least 0.3 wt % but less than 1 wt % is still more desirable.

Examples of pigments that can be used in an aspect of the invention include furnace black, lamp black, acetylene black, channel black and other forms of carbon black (C.I. pigment black 7) and copper oxides, iron oxides (C.I. pigment black 11), titanium oxide and other metals and aniline black (C.I. pigment black 1) and other organic pigments for example in the case of black ink, but carbon black is preferred for inkjet use because it has a relatively low specific density and does not tend to precipitate in water. Examples of color pigments include C.I. pigment yellow 1 (fast yellow G), 3, 12 (disazo yellow AAA), 13, 14, 17, 24, 34, 35, 37, 42 (yellow iron oxide), 53, 55, 74, 81, 83 (disazo yellow HR), 93, 94, 95, 97, 98, 100, 101, 104, 108, 109, 110, 117, 120, 128, 138, 153 and 180, C.I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209 and 219, C.I. pigment blue 1, 2, 15 (phthalocyanine blue R), 15:1, 15:2, 15:3 (phthalocyanine blue G), 15:4, 15:6 (phthalocyanine blue E), 16, 17:1, 56, 60 and 63, and C.I. pigment green 1, 4, 7, 8, 10, 17, 18 and 36 and the like.

According to an aspect of the present invention the added amount of the pigment is preferably 0.5% to 30% or more preferably 1.0% to 12%. Below this the printing concentration cannot be maintained, while if more than this is added the ink will be more viscous and will acquire structural viscosity, which tends to detract from discharge stability of the ink from the inkjet head.

When such an inkjet recording ink prepared with such a pigment uses a pigment other than yellow, such as C.I. black 7, C.I. pigment blue 15:1, C.I. pigment blue 15:2, C.I. pigment blue 15:3, C.I. pigment blue 15:4, C.I. pigment blue 15:6, C.I. pigment green 36, C.I. pigment red 122, C.I. pigment red 177, C.I. pigment red 254, C.I. pigment violet 19 or C.I. pigment violet 23, it is desirable from the standpoint of providing an inkjet recording ink with excellent storage stability and discharge stability which also has strong color development on plain and glossy paper and high glossiness on glossy paper that the pigment be dispersed using a polymer having an average particle diameter of 90 nm or less and an acid value of at least 50 mg KOH/g but not more than 100 mg KOH/g. If the average particle diameter is over 90 nm, glossiness on glossy paper will be reduced. Dispersal will be unstable if the acid value is below 50 mg KOH/g. If the acid value exceeds 100 mg KOH/g, color development on plain paper will be reduced. More preferably, the acid value is between 60 mg KOH/g and 100 mg KOH/g.

When such an inkjet recording ink prepared with such a pigment uses a yellow pigment such as C.I. pigment yellow 55, C.I. pigment yellow 74, C.I. pigment yellow 79, C.I. pigment yellow 93, C.I. pigment yellow 110, C.I. pigment yellow 120, C.I. pigment yellow 128, C.I. pigment yellow 138, C.I. pigment yellow 139, C.I. pigment yellow 150, C.I. pigment yellow 151, C.I. pigment yellow 155, C.I. pigment yellow 156, C.I. pigment yellow 175 or C.I. pigment yellow 180, it is desirable from the standpoint of providing an inkjet recording ink with excellent storage stability and discharge stability which also has strong color development on plain and glossy paper and high glossiness on glossy paper that the pigment be dispersed using a polymer having an average particle diameter of at least 20 nm but not more than 110 nm and an acid value of at least 50 mg KOH/g but not more than 120 mg KOH/g. If the average particle diameter is less than 20 nm light fastness will be poor, while if it exceeds 110 nm color development on plain paper will be reduced. If the acid value is below 50 mg KOH/g dispersal will be unstable, while if it exceeds 120 mg KOH/g color development on plain paper will be reduced.

One or more selected from the commercial styrene-(meth)acrylic acid copolymers, styrene-(meth)acrylic acid-(meth)acrylic acid ester copolymers, polyethylene glycol (meth)acrylate-(meth)acrylic acid copolymers, vinyl acetate-maleic acid copolymers, styrene-maleic acid copolymers and the like can be combined in the polymer for dispersing the pigment in an aspect of the present invention to the extent that the invention is not affected. However, it is desirable that at least 80% of the polymer be obtained by copolymerizing an acrylate and acrylic acid. A commercial acrylate such as methyl acrylate, ethyl acrylate, propyl acrylate, butyl acrylate, hexyl acrylate, cyclohexyl acrylate, octyl acrylate, lauryl acrylate, 2-ethylhexyl acrylate, 2-ethylhexylcarbitol acrylate, phenol EO denatured acrylate, N-vinylpyrrolidone, isobornyl acrylate, benzyl acrylate, paracumyl phenol EO denatured acrylate, 2-hydroxyethyl-3-phenoxypropyl acrylate or the like can be used as this acrylate. ω-carboxy-polycaprolactone monoacrylate, monohydroxyethyl phthalate acrylate, acrylic acid dimer or the like can also be used in place of acrylic acid.

The dispersal method using a polymer in an aspect of the invention is preferably phase inversion emulsification in water so as to coat the pigment with the polymer. Phase inversion emulsification produces a stable ink and better color development on plain paper.

If one or more selected from 2,4,7,9-tetramethyl-5-decyn-4,7-diol, 3,6-dimethyl-4-octyn-3,6-diol, 2,4,7,9-tetramethyl-5-decyn-4,7-diol alkylene oxide addition product and 3,6-dimethyl-4-octyn-3,6-diol alkylene oxide addition product is included in an amount less than 0.05 wt %, there will be more blurring on plain paper. If the amount exceeds 1 wt %, the inkjet ink will have poor storage stability, making long-term storage difficult. A more desirable range is at least 0.1 wt % but not more than 0.7 wt %.

2,4,7,9-tetramethyl-5-decyn-4,7-diol, 3,6-dimethyl-4-octyn-3,6-diol and 2,4,7,9-tetramethyl-5-decyn-4,7-diol alkylene oxide addition product are commercially available, and can be obtained for example as Nisshin Chemical Surfinol 104, Surfinol 82, Surfinol 2502, Surfinol 420, Surfinol 440, Surfinol 465, Surfinol 485 and Kawaken Fine Chemicals Acetylenol EOO, Acetylenol E40, Acetylenol E100 and the like.

It is desirable to include a 1,2-alkylene glycol in one aspect of the invention. Of the 1,2-alkylene glycols, 1,2-hexanediol and 4-methyl-1,2-pentanediol are particularly desirable, and the discharge stability of the inkjet ink is improved and blurring is reduced when printing on plain paper when these are used in addition to a pigment of an aspect of the present invention.

It is also desirable to include one or more selected from di(tri)ethylene glycol monobutyl ether, (di)propylene glycol monobutyl ether, di(tri)ethylene glycol monopentyl ether and di(tri)ethylene glycol monohexyl ether. Blurring is further reduced and printing quality is improved when printing on plain paper in an inkjet system when these glycol ethers are used in addition to a pigment of an aspect of the present invention.

It is also desirable to include 2-butyl-2-ethyl-1,3-propanediol, and glossiness on glossy paper and color development on plain paper are improved when 2-butyl-2-ethyl-1,3-propanediol is used in addition to a pigment of an aspect of the present invention.

A polymer in an aspect of the invention has carboxyl groups, and triethanolamine and/or tripropanolamine are preferably included as counter-ions. Clogging by the inkjet ink is unlikely to occur even when the ink is dry if triethanolamine and/or tripropanolamine are included.

Likewise, one or more selected from glycerin, trimethylolethane, trimethylolpropane and the tetrasaccharides, pentasaccharides and hexasaccharides is preferably included in order to reduce the risk of clogging by the inkjet ink.

An alcohol solvent, ketone solvent, ether solvent or glycol ether solvent can be used as the solvent in the method of polymerizing the polymer in an aspect of the present invention. However, because the pigment will be dispersed in a water system this solvent must be one that can be subsequently removed. The following can be used as such solvents. Examples of such alcohol solvents include methanol, ethanol, isopropanol, 1-butanol, tertiary butanol, isobutanol, diacetone alcohol and the like. Examples of such ketone solvents include acetone, methyl ethyl ketone, diethyl ketone, methyl isobutyl ketone, cyclohexanone and the like. Examples of such ether solvents include dibutyl ether, tetrahydrofuran, dioxane and the like. Examples of such glycol ethers include ethylene glycol monomethyl ether, diethylene glycol monomethyl ether, diethylene glycol monoethyl ether, diethylene glycol diethyl ether, butyl cellosolve and the like.

The radical polymerization initiator for polymerizing the polymer can be an organic peroxide such as t-butyl peroxy (2-ethylhexanoate), di-t-butyl peroxide, t-butyl peroxybenzoate or t-butyl peroxyoctoate, an azo compound such as 2,2'-azobisisobutyronitrile, 2,2'-azobis(2,4-dimethylvaleronitrile), dimethyl-2,2'-azobisbutyrate, 2,2'-azobis(2-methylbutyronitrile) or the like, or potassium persulfate, sodium persulfate or the like, but is not limited to these, and another initiator can be used as long as it can perform radical polymerization. The radical polymerization initiator is preferably used in the amount of at least 0.01 mol % but no more than 5 mol % of the monomers used during polymerization. The temperature for this polymerization is not particularly limited but is normally in the range of 30° C. to 100° C. or preferably 40° C. to 90° C. If the polymerization temperature is too low too much time may be required to polymerize the monomers, and in some cases the polymerization rate may decline, resulting in large quantities of residual monomers.

Dispersants, surface tension adjusters or isotonic agents (surfactants), humidity anti-drying agents, preservatives, antibacterial agents, pH adjusters, rustproofing agents, humectants and other additives can be used as necessary in aspects of the present invention. These may be used individually, or 2 or more may be used in combination.

Methods of manufacturing an inkjet ink according to an aspect of the invention include for example a method in which the polymer composition for the inkjet ink of this aspect is emulsified by high-speed agitation together with an aqueous solvent and an alkali such as sodium hydroxide or the like, and the pigment and the like are then added and forcibly dispersed with a disperser or the like. If necessary, it is also possible to disperse the pigment with a triple-roll mill, after which the resulting pigment slurry is dispersed with a high-pressure disperser or the like until the pigment reaches a specific particle diameter, and the organic solvent and the like are then removed from the resulting pigment dispersion solution.

The high-pressure disperser is not particularly limited, and may for example be a Microfluidizer (Microfluidics Co.), Altemizer (Sugino Machine), wet-jet mill (Genus Co.), Nanomizer (S.G. Engineering) or the like.

The pressure for dispersing with this high-pressure disperser may be any that achieves the desired pigment particle diameter, but is preferably 100 MPa to 300 MPa. Below 100 MPa the dispersed particle diameter may be too large, dispersal may take too much time, or it may be difficult to obtain a stable dispersion without an extremely large number of passes, which is uneconomical. Above 300 MPa overdispersal is likely, and a stable dispersion will probably not be obtained. When the desired pigment particle diameter cannot be achieved, the number of dispersals can be increased or the pressure can be raised within the pressure range described above.

An inkjet ink polymer composition solution that is obtained by adding an alkali solution to the inkjet ink polymer composition upon completion of polymerization, heating the composition and then removing the solvent and replacing it with ion-exchange water or the like can also be used in a method of manufacturing an inkjet ink of one aspect of the present invention.

It is also possible to use an inkjet ink polymer solution obtained by removing the solvent by vacuum distillation from the inkjet ink polymer upon completion of polymerization, pulverizing the resulting inkjet ink polymer solids, and adding and heating ion-exchange water, alkali solution and the like to dissolve the solids. This eliminates the need to remove any organic solvent or the like from the resulting pigment dispersion solution.

The alkali used in the aforementioned alkali solution may be triethanolamine, tripropanolamine or another tertiary alkanolamine or alkyl alkanolamine, or an inorganic salt such as sodium hydroxide, potassium hydroxide, lithium hydroxide or the like for example.

EXAMPLES

The present invention is explained in more detail below using Examples, but the invention is not limited only to these examples, and various changes are possible to the extent that they do not violate the intent of the invention.

Example 1

Nitrogen was substituted inside a 2000 ml separable flask equipped with an agitator, a circulating tube, a thermometer and a drip funnel, and 200.0 parts wt of methyl ethyl ketone were placed in the separable flask and heated to 80° C. with agitation. Next, 200.0 parts wt of methyl ethyl ketone, 483.0 parts wt of benzyl acrylate, 50.4 parts wt of acrylic acid and 4.8 parts wt of t-butylperoxy(2-ethylhexanoate) were placed in the drip funnel, and dripped into the separable flask over the course of 4 hours at 75° C. to perform the reaction. After completion of dripping, this was maintained at 75° C. for 1 hour, after which 0.8 parts wt of t-butylperoxy(2-ethylhexanoate) were added and reacted for 1 more hour at 75° C. Another 600.0 parts wt of methyl ethyl ketone were then added to obtain a polymer composition solution with a 50% resin solids component. When part of the polymer composition solution obtained in this way was taken and dried for 1 hours at 105° C. in an ignition drier, the resulting polymer composition solids had an acid value of 65 mg KOH/g and a weight-average molecular weight (WAMW) of 34,000.

Next, ion-exchange water and 3.0 parts wt of a 30% sodium hydroxide aqueous solution were added to 120.0 parts wt of the polymer composition solution prepared above and agitated for 5 minutes with a high-speed disperser, and 480.0 parts wt of C.I. pigment blue 15:4 (Clariant Co.) were added and agitated for 1 hour with a high-speed disperser to obtain a pigment dispersion slurry. This pigment dispersion slurry was then dispersed 10 times continuously at 200 MPa with an ultrahigh pressure homogenizer (Microfluidizer, Mizuho Industrial Co., Ltd.) to obtain a pigment dispersion liquid.

Part of the methyl ethyl ketone and water were removed by vacuum distillation with an evaporator from the resulting pigment dispersion liquid, which was then centrifuged for 30 minutes at 5000 rpm with a centrifuge (05P-21, Hitachi), after which ion-exchange water was added to a pigment concentration of 15 wt % to prepare the pigment dispersion. This was filtered under pressure with a 2.5 μm membrane filter (Advantech). The inkjet ink of ink composition 1 was then prepared as shown in Tables 4 through 6. A block adduct of nonyl alcohol with 7 moles propyleneoxy and 4 moles ethyleneoxy was used as the alkyl alcohol polyoxypropylene and polyoxyethylene addition product.

Example 2

The inkjet ink of Composition Example 2 as shown in Tables 4 through 6 was prepared as in Example 1 except that 483.0 parts wt of cyclohexyl acrylate were substituted for the 483.0 parts wt of benzyl acrylate, and 13.2 parts of methacrylic acid and 36.5 parts wt of acrylic acid were used instead of 50.4 parts wt of acrylic acid. A block adduct of nonyl alcohol with 7 moles propyleneoxy and 4 moles ethyleneoxy was used as the alkyl alcohol polyoxypropylene and polyoxyethylene addition product. When part of the polymer composition solution was taken and dried for 1 hour at 105° C. in an ignition drier, the resulting inkjet ink polymer composition solids had an acid value of 60 mg KOH/g and a weight-average molecular weight of 32,000.

Example 3

The inkjet ink of Composition Example 3 as shown in Tables 4 through 6 was prepared as in Example 1 except that 241.5 parts wt of benzyl acrylate and 241.5 parts wt of cyclohexyl acrylate were substituted for the 483.0 parts wt of benzyl acrylate, and 42.6 parts wt of acrylic acid were used instead of 50.4 parts wt of acrylic acid. A block adduct of nonyl alcohol with 7 moles propyleneoxy and 4 moles ethyleneoxy was used as the alkyl alcohol polyoxypropylene and polyoxyethylene addition product. When part of the polymer composition solution was taken and dried for 1 hour at 105° C. in an ignition drier, the resulting inkjet ink polymer composition solids had an acid value of 55 mg KOH/g and a weight-average molecular weight of 48,000.

Example 4

The inkjet ink of Composition Example 4 as shown in Tables 4 through 6 was prepared as in Example 1 except that 241.5 parts wt of benzyl acrylate and 241.5 parts wt of benzyl methacrylate were substituted for the 483.0 parts wt of benzyl acrylate, and 77.5 parts wt of acrylic acid were used instead of 50.4 parts wt of acrylic acid. A block adduct of nonyl alcohol with 7 moles propyleneoxy and 4 moles ethyleneoxy was used as the alkyl alcohol polyoxypropylene and polyoxyethylene addition product. When part of the polymer composition solution was taken and dried for 1 hour at 105° C. in an ignition drier, the resulting inkjet ink polymer composition solids had an acid value of 100 mg KOH/g and a weight-average molecular weight of 29,000.

Example 5

The inkjet ink of Composition Example 4 as shown in Tables 4 through 6 was prepared as in Example 1 except that 241.5 parts wt of benzyl acrylate and 241.5 parts wt of cyclohexyl methacrylate were substituted for the 483.0 parts wt of benzyl acrylate, and 93.0 parts wt of acrylic acid were used instead of 50.4 parts wt of acrylic acid. A block adduct of nonyl alcohol with 7 moles propyleneoxy and 4 moles ethyleneoxy was used as the alkyl alcohol polyoxypropylene and polyoxyethylene addition product. When part of the polymer composition solution was taken and dried for 1 hour at 105° C. in an ignition drier, the resulting inkjet ink polymer composition solids had an acid value of 120 mg KOH/g and a weight-average molecular weight of 34,000.

Example 6

The inkjet ink of Composition Example 13 as shown in Tables 4 through 6 was prepared as in Example 1 except that Monarch 800 (C.I. PBk7: Cabot Corp.) was substituted for the 480.0 parts wt of C.I. pigment blue 15:4 with a pigment concentration of 25 wt %. A block adduct of nonyl alcohol with 9 moles of propyleneoxy and 4 moles of ethyleneoxy was used as the alkyl alcohol polyoxypropylene and polyoxyethylene addition product.

Example 7

The inkjet ink of Composition Example 14 as shown in Tables 4 through 6 was prepared as in Example 2 except that Monarch 800 (C.I. PBk7: Cabot Corp.) was substituted for the 480.0 parts wt of C.I. pigment blue 15:4 with a pigment concentration of 25 wt %. A block adduct of decyl alcohol with 6 moles of propyleneoxy and 5 moles of ethyleneoxy was used as the alkyl alcohol polyoxypropylene and polyoxyethylene addition product.

Example 8

The inkjet ink of Composition Example 19 as shown in Tables 4 through 6 was prepared as in Example 1 except that 120.0 parts wt of C.I. pigment violet 19 were substituted for the 120.0 parts wt of C.I. pigment blue 15:4. A block adduct of undecyl alcohol with 4 moles propyleneoxy and 7 moles ethyleneoxy was used as the alkyl alcohol polyoxypropylene and polyoxyethylene addition product.

Example 9

The inkjet ink of Composition Example 20 as shown in Tables 4 through 6 was prepared as in Example 2 except that 120.0 parts wt of C.I. pigment violet 19 were substituted for the 120.0 parts wt of C.I. pigment blue 15:4. A block adduct of nonyl alcohol with 7 moles of propyleneoxy and 4 moles of ethyleneoxy was used as the alkyl alcohol polyoxypropylene and polyoxyethylene addition product.

Example 10

The inkjet ink of Composition Example 25 as shown in Tables 4 through 6 was prepared as in Example 1 except that 120.0 parts wt of C.I. pigment yellow 74 were substituted for the 120.0 parts wt of C.I. pigment blue 15:4. A block adduct of nonyl alcohol with 7 moles of propyleneoxy and 4 moles of ethyleneoxy was used as the alkyl alcohol polyoxypropylene and polyoxyethylene addition product.

Example 11

The inkjet ink of Composition Example 26 as shown in Tables 4 through 6 was prepared as in Example 2 except that 120.0 parts wt of C.I. pigment yellow 74 were substituted for the 120.0 parts wt of C.I. pigment blue 15:4. A block adduct of nonyl alcohol with 7 moles propyleneoxy and 4 moles ethyleneoxy was used as the alkyl alcohol polyoxypropylene and polyoxyethylene addition product.

Example 12

The inkjet ink of Composition Example 31 as shown in Tables 4 through 6 was prepared as in Example 8 except that a block adduct of octyl alcohol with 4 moles propyleneoxy and 4 moles ethyleneoxy was used as the alkyl alcohol polyoxypropylene and polyoxyethylene addition product.

Example 13

The inkjet ink of Composition Example 32 as shown in Tables 4 through 6 was prepared as in Example 8 except that a block adduct of nonyl alcohol with 9 moles propyleneoxy and 4 moles ethyleneoxy was used as the alkyl alcohol polyoxypropylene and polyoxyethylene addition product.

Example 14

The inkjet ink of Composition Example 33 as shown in Tables 4 through 6 was prepared as in Example 8 except that a block adduct of nonyl alcohol with 6 moles propyleneoxy and 5 moles ethyleneoxy was used as the alkyl alcohol polyoxypropylene and polyoxyethylene addition product.

Example 15

The inkjet ink of Composition Example 34 as shown in Tables 4 through 6 was prepared as in Example 8 except that a block adduct of undecyl alcohol with 5 moles propyleneoxy and 6 moles ethyleneoxy was used as the alkyl alcohol polyoxypropylene and polyoxyethylene addition product.

Example 16

The inkjet ink of Composition Example 35 as shown in Tables 4 through 6 was prepared as in Example 8 except that a block adduct of dodecyl alcohol with 4 moles propyleneoxy and 6 moles ethyleneoxy was used as the alkyl alcohol polyoxypropylene and polyoxyethylene addition product.

Example 17

The inkjet ink of Composition Example 36 as shown in Tables 4 through 6 was prepared as in Example 8 except that a block adduct of nonyl alcohol with 7 moles propyleneoxy and 4 moles ethyleneoxy was used as the alkyl alcohol polyoxypropylene and polyoxyethylene addition product.

Example 18

The inkjet ink of Composition Example 37 as shown in Tables 4 through 6 was prepared as in Example 8 except that a block adduct of nonyl alcohol with 3 moles ethyleneoxy and 4 moles propyleneoxy was used as the alkyl alcohol polyoxypropylene and polyoxyethylene addition product.

Example 19

The inkjet ink of Composition Example 38 as shown in Tables 4 through 6 was prepared as in Example 8 except that a block adduct of nonyl alcohol with 4 moles ethyleneoxy and 7 moles propyleneoxy was used as the alkyl alcohol polyoxypropylene and polyoxyethylene addition product.

Example 20

The inkjet ink of Composition Example 39 as shown in Tables 4 through 6 was prepared as in Example 8 except that a block adduct of dodecyl alcohol with 7 moles propyleneoxy 4 and 6 moles ethyleneoxy was used as the alkyl alcohol polyoxypropylene and polyoxyethylene addition product.

Comparative Example 1

The inkjet ink of Composition Example 6 as shown in Tables 4 through 6 was prepared as in Example 1 except that 100.8 parts wt of acrylic acid were used instead of 50.4 parts wt of acrylic acid. A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 130 mg KOH/g and a weight-average molecular weight of 29,000.

Comparative Example 2

The inkjet ink of Composition Example 7 as shown in Tables 4 through 6 was prepared as in Example 1 except that 116.3 parts wt of acrylic acid were used instead of 50.4 parts wt of acrylic acid. A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 150 mg KOH/g and a weight-average molecular weight of 34,000.

Comparative Example 3

The inkjet ink of Composition Example 8 as shown in Tables 4 through 6 was prepared as in Example 1 except that 155.0 parts wt of acrylic acid were used instead of 50.4 parts wt of acrylic acid. A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 200 mg KOH/g and a weight-average molecular weight of 29,000.

Comparative Example 4

The inkjet ink of Composition Example 9 as shown in Tables 4 through 6 was prepared as in Example 1 except that 20.0 parts wt of t-butylperoxy(2-ethylhexanoate) were used instead of 4.8 parts wt of t-butylperoxy(2-ethylhexanoate). A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 65 mg KOH/g and a weight-average molecular weight of 10,000.

Comparative Example 5

The inkjet ink of Composition Example 10 as shown in Tables 4 through 6 was prepared as in Example 2 except that 15.0 parts wt of t-butylperoxy(2-ethylhexanoate) were used instead of 4.8 parts wt of t-butylperoxy(2-ethylhexanoate). A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 60 mg KOH/g and a weight-average molecular weight of 18,000.

Comparative Example 6

The inkjet ink of Composition Example 11 as shown in Tables 4 through 6 was prepared as in Example 1 except that 3.1 parts wt of t-butylperoxy(2-ethylhexanoate) were used instead of 4.8 parts wt of t-butylperoxy(2-ethylhexanoate). A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 65 mg KOH/g and a weight-average molecular weight of 140,000.

Comparative Example 7

The inkjet ink of Composition Example 12 as shown in Tables 4 through 6 was prepared as in Example 1 except that 23.3 parts wt of acrylic acid were used rather than 50.4 parts wt of acrylic acid. A block adduct of nonyl alcohol with 4 moles ethyleneoxy and 7 moles propyleneoxy was used as the alkyl alcohol polyoxypropylene and polyoxyethylene addition product. When part of the polymer composition solution was taken and dried for 1 hour in an ignition dryer at 105° C., the resulting inkjet ink polymer composition solids had an acid value of 30 mg KOH/g and a weight-average molecular weight of 33,000.

Comparative Example 8

The inkjet ink of Composition Example 15 as shown in Tables 4 through 6 was prepared as in Comparative Example 1 except that the 480.0 parts wt of C. I. pigment blue 15:4 were replaced with 480.0 parts wt of Monarch 800 (C.I. PBk7: Cabot Corp.). A block adduct of undecyl alcohol with 6 moles ethyleneoxy and 5 moles propyleneoxy was used as the alkyl alcohol polyoxypropylene and polyoxyethylene addition product.

Comparative Example 9

The inkjet ink of Composition Example 16 as shown in Tables 4 through 6 was prepared as in Comparative Example 5 except that the 480.0 parts wt of C.I. pigment blue 15:4 were replaced with 480.0 parts wt of Monarch 800 (C.I. PBk7: Cabot Corp.). A block adduct of dodecyl alcohol with 6 moles ethyleneoxy and 4 moles propyleneoxy was used as the alkyl alcohol polyoxypropylene and polyoxyethylene addition product.

Comparative Example 10

The inkjet ink of Composition Example 17 as shown in Tables 4 through 6 was prepared as in Comparative Example 6 except that the 480.0 parts wt of C. I. pigment blue 15:4 were replaced with 480.0 parts wt of Monarch 800 (C. I. PBk7: Cabot Co.). A block adduct of nonyl alcohol with 4 moles ethyleneoxy and 7 moles propyleneoxy was used as the alkyl alcohol polyoxypropylene and polyoxyethylene addition product.

Comparative Example 11

The inkjet ink of Composition Example 18 as shown in Tables 4 through 6 was prepared as in Comparative Example 7 except that the 480.0 parts wt of C.I. pigment blue 15:4 were replaced with 480.0 parts wt of Monarch 800 (C.I. PBk7: Cabot Corp.). A block adduct of nonyl alcohol with 4 moles ethyleneoxy and 3 moles propyleneoxy was used as the alkyl alcohol polyoxypropylene and polyoxyethylene addition product.

Comparative Example 12

The inkjet ink of Composition Example 21 as shown in Tables 4 through 6 was prepared as in Comparative Example 1 except that the 480.0 parts wt of C.I. pigment blue 15:4 were replaced with 480.0 parts wt of C.I. pigment violet 19. A block adduct of nonyl alcohol with 4 moles ethyleneoxy and 7 moles propyleneoxy was used as the alkyl alcohol polyoxypropylene and polyoxyethylene addition product.

Comparative Example 13

The inkjet ink of Composition Example 22 as shown in Tables 4 through 6 was prepared as in Comparative Example 5 except that the 480.0 parts wt of C. I. pigment blue 15:4 were replaced with 480.0 parts wt of C. I. pigment violet 19. A block adduct of nonyl alcohol with 4 moles ethyleneoxy and 7 moles propyleneoxy was used as the alkyl alcohol polyoxypropylene and polyoxyethylene addition product.

Comparative Example 14

The inkjet ink of Composition Example 23 as shown in Tables 4 through 6 was prepared as in Comparative Example 6 except that the 480.0 parts wt of C.I. pigment blue 15:4 were replaced with 480.0 parts wt of Pigment Violet GC227-A. A block adduct of nonyl alcohol with 4 moles ethyleneoxy and 7 moles propyleneoxy was used as the alkyl alcohol polyoxypropylene and polyoxyethylene addition product.

Comparative Example 15

The inkjet ink of Composition Example 24 as shown in Tables 4 through 6 was prepared as in Comparative Example 7 except that the 480.0 parts wt of C.I. pigment blue 15:4 were replaced with 480.0 parts wt of C.I. pigment violet 19. A block adduct of nonyl alcohol with 4 moles ethyleneoxy and 7 moles propyleneoxy was used as the alkyl alcohol polyoxypropylene and polyoxyethylene addition product.

Comparative Example 16

The inkjet ink of Composition Example 27 as shown in Tables 4 through 6 was prepared as in Comparative Example 1 except that the 480.0 parts wt of C. I. pigment blue 15:4 were replaced with 480.0 parts wt of C. I. pigment yellow 74. A block adduct of nonyl alcohol with 4 moles ethyleneoxy and 7 moles propyleneoxy was used as the alkyl alcohol polyoxypropylene and polyoxyethylene addition product.

Comparative Example 17

The inkjet ink of Composition Example 28 as shown in Tables 4 through 6 was prepared as in Comparative Example 5 except that the 480.0 parts wt of C.I. pigment blue 15:4 were replaced with 480.0 parts wt of C.I. pigment yellow 74. A block adduct of nonyl alcohol with 4 moles ethyleneoxy and 7 moles propyleneoxy was used as the alkyl alcohol polyoxypropylene and polyoxyethylene addition product.

Comparative Example 18

The inkjet ink of Composition Example 29 as shown in Tables 4 through 6 was prepared as in Comparative Example 6 except that the 480.0 parts wt of C.I. pigment blue 15:4 were replaced with 480.0 parts wt of C.I. pigment yellow 74. A block adduct of nonyl alcohol with 4 moles ethyleneoxy and 7 moles propyleneoxy was used as the alkyl alcohol polyoxypropylene and polyoxyethylene addition product.

Comparative Example 19

The inkjet ink of Composition Example 30 as shown in Tables 4 through 6 was prepared as in Comparative Example 7 except that the 480.0 parts wt of C.I. pigment blue 15:4 were replaced with 480.0 parts wt of C.I. pigment yellow 74. A block adduct of nonyl alcohol with 4 moles ethyleneoxy and 7 moles propyleneoxy was used as the alkyl alcohol polyoxypropylene and polyoxyethylene addition product.

Comparative Example 20

The inkjet ink of Composition Example 31 as shown in Tables 4 through 6 was prepared as in Example 8 except that a block adduct of hexyl alcohol with 4 moles propyleneoxy and 4 moles ethyleneoxy was used as the alkyl alcohol polyoxypropylene and polyoxyethylene addition product.

Comparative Example 21

The inkjet ink of Composition Example 40 as shown in Tables 4 through 6 was prepared as in Example 8 except that a block adduct of eicosanol with 7 moles propyleneoxy and 20 moles ethyleneoxy was used as the alkyl alcohol polyoxypropylene and polyoxyethylene addition product.

Comparative Example 22

The inkjet ink of Composition Example 41 as shown in Tables 4 through 6 was prepared as in Example 8 except that a block adduct of nonyl alcohol with 2 moles propyleneoxy and 8 moles ethyleneoxy was used as the alkyl alcohol polyoxypropylene and polyoxyethylene addition product.

Comparative Example 23

The inkjet ink of Composition Example 42 as shown in Tables 4 through 6 was prepared as in Example 8 except that a block adduct of nonyl alcohol with 13 moles propyleneoxy and 20 moles ethyleneoxy was used as the alkyl alcohol polyoxypropylene and polyoxyethylene addition product.

Comparative Example 24

The inkjet ink of Composition Example 43 as shown in Tables 4 through 6 was prepared as in Example 8 except that a block adduct of eicosanol with 10 moles propyleneoxy and 20 moles ethyleneoxy was used as the alkyl alcohol polyoxypropylene and polyoxyethylene addition product.

Comparative Example 25

The inkjet ink of Composition Example 44 as shown in Tables 4 through 6 was prepared as in Example 8 except that a block adduct of heptyl alcohol with 10 moles propyleneoxy and 20 moles ethyleneoxy was used as the alkyl alcohol polyoxypropylene and polyoxyethylene addition product.

Evaluation Test 1: Method for Evaluating Plain Paper Color Development

The inkjet inks of Examples 1 through 11 and Comparative Examples 1 through 19 were solid printed on Xerox P paper (Fuji Xerox) using an inkjet printer (EM-930C, Seiko Epson) to obtain test samples. The printing modes were paper: plain paper, print quality: superfine, color correction: none, printing direction: both directions. The OD values of each color were measured using a GretagMacbeth Spectroscan SP50 (Gretag (U.S.)). The results are shown in Tables 1 through 3 as OD values.

Evaluation Test 2: Method for Evaluating Glossiness

The inkjet inks of Examples 1 through 11 and Comparative Examples 1 through 19 were solid printed on PM photographic paper (Seiko Epson) with an inkjet printer (EM-930C, Seiko Epson) to obtain test samples. The printing modes were paper: photo print paper, print quality: photo, color correction: none, printing direction: both directions. The 20° glossiness of the test samples was measured with a gloss meter (HG-268, Suga Test Instruments). The results are shown in Tables 1 through 3.

Evaluation Test 3: Method for Evaluating Dispersibility

The average particle diameters of the particles in the inkjet inks of Examples 1 through 11 and Comparative Examples 1 through 19 were measured with a laser particle size analyzer (Zetasizer 3000, Malvern (U.K.)). The results are shown in Tables 1 through 3.

Evaluation Test 4: Method for Evaluating Storage Stability

The initial viscosity and viscosity after 1 week's storage at 70° C. of the pigment dispersions for the inkjet inks of Examples 1 through 11 and Comparative Examples 1 through 19 were measured with a rolling ball viscometer (AMVn, Anton-Paar, Germany). The results for storage stability are given in Tables 1 through 3 as viscosity (mPa-s) after 1 week's storage at 70° C. divided by initial viscosity (mPa-s).

The monomer compositions, polymerization initiators and pigments used in manufacturing the inkjet inks are given in Tables 1 through 3 along with the inkjet ink compositions.

TABLE 1

|  | Ex 1 | Ex 2 | Ex 3 | Ex 4 | Ex 5 | CE 1 | CE 2 | CE 3 |
|---|---|---|---|---|---|---|---|---|
| BZA | 483.0 | — | 241.5 | 241.5 | — | 483.0 | 483.0 | 483.0 |
| BZMA | — | — | — | 241.5 | 241.5 | — | — | — |
| CHA | — | 483.0 | 241.5 | — | — | — | — | — |
| CHMA | — | — | — | — | 241.5 | — | — | — |
| AA | 50.4 | 36.5 | 42.6 | 77.5 | 93.0 | 100.8 | 116.3 | 155.0 |
| MAA | — | 13.2 | — | — | — | — | — | — |
| BPEH | 5.6 | 5.6 | 5.6 | 5.6 | 5.6 | 5.6 | 5.6 | 5.6 |
| PBk7 | — | — | — | — | — | — | — | — |
| PB15:4 | 480.0 | 480.0 | 480.0 | 480.0 | 480.0 | 480.0 | 480.0 | 480.0 |
| PV19 | — | — | — | — | — | — | — | — |
| PY74 | — | — | — | — | — | — | — | — |
| Acid val. (mgKOH/g) | 65 | 60 | 55 | 100 | 120 | 130 | 150 | 200 |
| WAMW | 34000 | 32000 | 48000 | 29000 | 34000 | 29000 | 34000 | 29000 |
| Gloss | 71.3 | 68.9 | 70.9 | 76.8 | 74.2 | 74.2 | 77.1 | 76.5 |
| Average particle dia. (nm) | 71 | 72 | 70 | 70 | 66 | 72 | 77 | 92 |
| Stability | 1.00 | 0.99 | 1.01 | 1.05 | 1.08 | 1.62 | 2.36 | 2.65 |
| OD | 1.20 | 1.20 | 1.21 | 1.17 | 1.01 | 0.95 | 0.91 | 0.93 |

|  | CE 4 | CE 5 | CE 6 | CE 7 | Ex 6 | Ex 7 | CE 8 |
|---|---|---|---|---|---|---|---|
| BZA | 483.0 | 483.0 | 483.0 | 483.0 | 483.0 | — | 483.0 |
| BZMA | — | — | — | — | — | — | — |
| CHA | — | — | — | — | — | 483.0 | — |
| CHMA | — | — | — | — | — | — | — |
| AA | 50.4 | 36.5 | 50.4 | 23.3 | 50.4 | 36.5 | 100.8 |
| MAA | — | 13.2 | — | — | — | 13.2 | — |
| BPEH | 20.0 | 15.0 | 3.1 | 5.6 | 5.6 | 5.6 | 5.6 |
| PBk7 | — | — | — | — | 480.0 | 480.0 | 480.0 |
| PB15:4 | 480.0 | 480.0 | 480.0 | 480.0 | — | — | — |
| PV19 | — | — | — | — | — | — | — |
| PY74 | — | — | — | — | — | — | — |
| Acid val. (mgKOH/g) | 65 | 60 | 65 | 30 | 65 | 60 | 130 |
| WAMW | 10000 | 18000 | 140000 | 33000 | 34000 | 32000 | 29000 |
| Gloss | 42.1 | 40.5 | 25.4 | 30.1 | 50.6 | 52.1 | 44.3 |
| Average particle dia. (nm) | 102 | 98 | 120 | 165 | 95 | 98 | 110 |
| Stability | 106.20 | 65.80 | 19.60 | 210.20 | 1.02 | 0.99 | 1.96 |
| OD | 1.11 | 1.11 | 1.06 | 1.20 | 1.30 | 1.28 | 0.98 |

TABLE 2

|  | CE 9 | CE 10 | CE 11 | Ex 8 | Ex 9 | CE 12 | CE 13 | CE 14 |
|---|---|---|---|---|---|---|---|---|
| BZA | 483.0 | 483.0 | 483.0 | 483.0 | — | 483.0 | 483.0 | 483.0 |
| BZMA | — | — | — | — | — | — | — | — |
| CHA | — | — | — | — | 483.0 | — | — | — |
| CHMA | — | — | — | — | — | — | — | — |
| AA | 36.5 | 50.4 | 23.3 | 50.4 | 36.5 | 100.8 | 36.5 | 50.4 |
| MAA | 13.2 | — | — | — | 13.2 | — | 13.2 | — |
| BPEH | 15.0 | 3.1 | 5.6 | 5.6 | 5.6 | 5.6 | 15.0 | 3.1 |
| PBk7 | 480.0 | 480.0 | 480.0 | — | — | — | — | — |
| PB15:4 | — | — | — | — | — | — | — | — |
| PV19 | — | — | — | 480.0 | 480.0 | 480.0 | 480.0 | 480.0 |
| PY74 | — | — | — | — | — | — | — | — |
| Acid val. (mgKOH/g) | 60 | 65 | 30 | 65 | 60 | 130 | 60 | 65 |
| WAMW | 18000 | 140000 | 33000 | 34000 | 32000 | 29000 | 18000 | 140000 |
| Gloss | 45.8 | 31.2 | 50.6 | 68.2 | 74.6 | 70.3 | 62.9 | 34.6 |
| Average particle dia. (nm) | 130 | 156 | 146 | 71 | 72 | 71 | 89 | 110 |
| Stability | 40.30 | 32.10 | 162.30 | 1.02 | 1.00 | 1.01 | 35.20 | 53.20 |
| OD | 1.28 | 1.10 | 1.03 | 1.20 | 1.21 | 1.02 | 1.10 | 1.00 |

|  | CE 15 | Ex 10 | Ex 11 | CE 16 | CE 17 | CE 18 | CE 19 |
|---|---|---|---|---|---|---|---|
| BZA | 483.0 | 483.0 | — | 483.0 | 483.0 | 483.0 | 483.0 |
| BZMA | — | — | — | — | — | — | — |
| CHA | — | — | 483.0 | — | — | — | — |
| CHMA | — | — | — | — | — | — | — |
| AA | 23.3 | 50.4 | 36.5 | 100.8 | 36.5 | 50.4 | 23.3 |

TABLE 2-continued

|  |  |  |  |  |  |  |  |
|---|---|---|---|---|---|---|---|
| MAA | — | — | 13.2 | — | 13.2 | — | — |
| BPEH | 5.6 | 5.6 | 5.6 | 5.6 | 15.0 | 3.1 | 5.6 |
| PBk7 | — | — | — | — | — | — | — |
| PB15:4 | — | — | — | — | — | — | — |
| PV19 | 480.0 | — | — | — | — | — | — |
| PY74 | — | 480.0 | 480.0 | 480.0 | 480.0 | 480.0 | 480.0 |
| Acid val. (mgKOH/g) | 30 | 65 | 60 | 130 | 60 | 65 | 30 |
| WAMW | 33000 | 34000 | 32000 | 29000 | 18000 | 140000 | 33000 |
| Gloss | 25.4 | 80.1 | 79.6 | 63.2 | 40.6 | 34.2 | 28.6 |
| Average particle dia. (nm) | 123 | 85 | 92 | 91 | 120 | 125 | 135 |
| Stability | 165.30 | 1.01 | 0.99 | 1.01 | 32.50 | 58.60 | 154.30 |
| OD | 1.02 | 1.20 | 1.22 | 1.00 | 1.11 | 1.10 | 1.04 |

TABLE 3

|  | Ex 12 | Ex 13 | Ex 14 | Ex 15 | Ex 16 | Ex 17 | Ex 18 | Ex 19 |
|---|---|---|---|---|---|---|---|---|
| BZA | 483.0 | 483.0 | 483.0 | 483.0 | 483.0 | 483.0 | 483.0 | 483.0 |
| BZMA | — | — | — | — | — | — | — | — |
| CHA | — | — | — | — | — | — | — | — |
| CHMA | — | — | — | — | — | — | — | — |
| AA | 50.4 | 50.4 | 50.4 | 50.4 | 50.4 | 50.4 | 50.4 | 50.4 |
| MAA | — | — | — | — | — | — | — | — |
| BPEH | 5.6 | 5.6 | 5.6 | 5.6 | 5.6 | 5.6 | 5.6 | 5.6 |
| PBk7 | — | — | — | — | — | — | — | — |
| PB15:4 | — | — | — | — | — | — | — | — |
| PV19 | 480.0 | 480.0 | 480.0 | 480.0 | 480.0 | 480.0 | 480.0 | 480.0 |
| PY74 | — | — | — | — | — | — | — | — |
| Acid val. (mgKOH/g) | 65 | 65 | 65 | 65 | 65 | 65 | 65 | 65 |
| WAMW | 34000 | 34000 | 34000 | 34000 | 34000 | 34000 | 34000 | 34000 |
| Gloss | 77.2 | 74.2 | 78.6 | 67.4 | 66.2 | 62.3 | 70.1 | 65.2 |
| Average particle dia. (nm) | 71 | 71 | 71 | 71 | 71 | 71 | 71 | 71 |
| Stability | 1.00 | 1.00 | 1.00 | 1.01 | 1.01 | 1.00 | 1.01 | 1.01 |
| OD | 1.19 | 1.19 | 1.19 | 1.19 | 1.19 | 1.15 | 1.19 | 1.14 |

|  | Ex 20 | CE 20 | CE 21 | CE 22 | CE 23 | CE 24 | CE 25 |
|---|---|---|---|---|---|---|---|
| BZA | 483.0 | 483.0 | 483.0 | 483.0 | 483.0 | 483.0 | 483.0 |
| BZMA | — | — | — | — | — | — | — |
| CHA | — | — | — | — | — | — | — |
| CHMA | — | — | — | — | — | — | — |
| AA | 50.4 | 50.4 | 50.4 | 50.4 | 50.4 | 50.4 | 50.4 |
| MAA | — | — | — | — | — | — | — |
| BPEH | 5.6 | 5.6 | 5.6 | 5.6 | 5.6 | 5.6 | 5.6 |
| PBk7 | — | — | — | — | — | — | — |
| PB15:4 | — | — | — | — | — | — | — |
| PV19 | 480.0 | 480.0 | 480.0 | 480.0 | 480.0 | 480.0 | 480.0 |
| PY74 | — | — | — | — | — | — | — |
| Acid val. (mgKOH/g) | 65 | 65 | 65 | 65 | 65 | 65 | 65 |
| WAMW | 34000 | 34000 | 34000 | 34000 | 34000 | 34000 | 34000 |
| Gloss | 72.1 | 41.6 | 43.1 | 50.6 | 40.1 | 42.1 | 40.1 |
| Average particle dia. (nm) | 71 | 71 | 71 | 71 | 71 | 71 | 71 |
| Stability | 1.00 | 1.00 | 1.00 | 1.01 | 1.00 | 1.01 | 1.01 |
| OD | 1.19 | 1.19 | 1.06 | 1.10 | 1.05 | 1.02 | 1.00 |

TABLE 4

|  | Composition Example | | | | | | | |
|---|---|---|---|---|---|---|---|---|
| Example/Comparative Example | 1 Ex 1 | 2 Ex 2 | 3 Ex 3 | 4 Ex 4 | 5 Ex 5 | 6 CE 1 | 7 CE 2 | 8 CE 3 |
| PB 15:4 | 4 | 4 | 4 | 4 | 4 | 4 | 4 | 4 |
| PBk7 | — | — | — | — | — | — | — | — |
| PV19 | — | — | — | — | — | — | — | — |
| PY74 | — | — | — | — | — | — | — | — |
| DEGmBE | 0.2 | 0.2 | 0.2 | 0.2 | 0.2 | 0.2 | 0.2 | 0.2 |
| TEGmBE | 1 | 1 | 1 | 1 | 1 | 1 | 1 | 1 |
| PGmBE | — | — | — | — | — | — | — | — |
| DPGmBE | 0.1 | 0.1 | 0.1 | 0.1 | 0.1 | 0.1 | 0.1 | 0.1 |
| BEPD | 0.1 | 0.1 | 0.1 | 0.1 | 0.1 | 0.1 | 0.1 | 0.1 |
| Formula 1 added | 1 | 1 | 1 | 1 | 1 | 1 | 1 | 1 |
| Formula 1 R | 9 | 9 | 9 | 9 | 9 | 9 | 9 | 9 |

TABLE 4-continued

| | | | | | | | | |
|---|---|---|---|---|---|---|---|---|
| Formula 1 n | 7 | 7 | 7 | 7 | 7 | 7 | 7 | 7 |
| Formula 1 m | 4 | 4 | 4 | 4 | 4 | 4 | 4 | 4 |
| Formula 1 Order of addition | R-POEO | R-POEO | R-POEO | R-POEO | R-POEO | R-POEO | R-POEO | R-POEO |
| Formula 1 Form of addition | Block | Block | Block | Block | Block | Block | Block | Block |
| 1,2-HD | 4 | 4 | 4 | 4 | 4 | 4 | 4 | 4 |
| Glycerin | 15 | 15 | 15 | 15 | 15 | 15 | 15 | 15 |
| TMP | 7 | 7 | 7 | 7 | 7 | 7 | 7 | 7 |
| Olefin E1010 | 0.1 | 0.1 | 0.1 | 0.1 | 0.1 | 0.1 | 0.1 | 0.1 |
| Surfinol 104 | 0.15 | 0.15 | 0.15 | 0.15 | 0.15 | 0.15 | 0.15 | 0.15 |
| Ion-exchange water | Trace | Trace | Trace | Trace | Trace | Trace | Trace | Trace |

| | Composition Example | | | | | | |
|---|---|---|---|---|---|---|---|
| Example/Comparative Example | 9 CE 4 | 10 CE 5 | 11 CE 6 | 12 CE 7 | 13 Ex 6 | 14 Ex 7 | 15 CE 8 |
| PB 15:4 | 4 | 4 | 4 | 4 | — | — | — |
| PBk7 | — | — | — | — | 5 | 5 | 5 |
| PV19 | — | — | — | — | — | — | — |
| PY74 | — | — | — | — | — | — | — |
| DEGmBE | 0.2 | 0.2 | 0.2 | 0.2 | — | — | — |
| TEGmBE | 1 | 1 | 1 | 1 | 2 | 3 | 4 |
| PGmBE | — | — | — | — | — | — | — |
| DPGmBE | 0.1 | 0.1 | 0.1 | 0.1 | — | — | — |
| BEPD | 0.1 | 0.1 | 0.1 | 0.1 | 0.1 | 0.1 | 0.1 |
| Formula 1 added | 1 | 1 | 1 | 1 | 1 | 1 | 1 |
| Formula 1 R | 9 | 9 | 9 | 8 | 9 | 10 | 11 |
| Formula 1 n | 7 | 7 | 7 | 4 | 9 | 6 | 5 |
| Formula 1 m | 4 | 4 | 4 | 4 | 5 | 6 | 6 |
| Formula 1 Order of addition | R-POEO | R-POEO | R-POEO | R-POEO | R-POEO | R-POEO | R-POEO |
| Formula 1 Form of addition | Block | Block | Block | Block | Block | Block | Block |
| 1,2-HD | 4 | 4 | 4 | 4 | 3 | 3 | 3 |
| Glycerin | 15 | 15 | 15 | 15 | 10 | 10 | 10 |
| TMP | 7 | 7 | 7 | 7 | 4 | 4 | 4 |
| Olefin E1010 | 0.1 | 0.1 | 0.1 | 0.1 | 0.1 | 0.1 | 0.1 |
| Surfinol 104 | 0.15 | 0.15 | 0.15 | 0.15 | 0.15 | 0.15 | 0.15 |
| Ion-exchange water | Trace | Trace | Trace | Trace | Trace | Trace | Trace |

TABLE 5

| | Composition Example | | | | | | | |
|---|---|---|---|---|---|---|---|---|
| Example/Comparative Example | 16 CE 9 | 17 CE 10 | 18 CE 11 | 19 Ex 8 | 20 Ex 9 | 21 CE 12 | 22 CE 13 | 23 CE 14 |
| PB 15:4 | — | — | — | — | — | — | — | — |
| PBk7 | 5 | 5 | 5 | — | — | — | — | — |
| PV19 | — | — | — | 5 | 5 | 5 | 5 | 5 |
| PY74 | — | — | — | — | — | — | — | — |
| DEGmBE | — | — | — | 0.3 | 0.3 | 0.3 | 0.3 | 0.3 |
| TEGmBE | 4 | 5 | 6 | 1 | 1 | 1 | 1 | 1 |
| PGmBE | — | — | — | — | — | — | — | — |
| DPGmBE | — | — | — | — | — | — | — | — |
| BEPD | 0.1 | 0.1 | 0.1 | 0.1 | 0.1 | 0.1 | 0.1 | 0.1 |
| Formula 1 added | 1 | 1 | 1 | 1 | 1 | 1 | 1 | 1 |
| Formula 1 R | 12 | 9 | 9 | 11 | 9 | 9 | 9 | 9 |
| Formula 1 n | 4 | 7 | 3 | 4 | 7 | 7 | 7 | 7 |
| Formula 1 m | 6 | 4 | 4 | 7 | 4 | 4 | 4 | 4 |
| Order of addition | R-POEO | R-POEO | R-POEO | R-EOPO | R-POEO | R-POEO | R-POEO | R-POEO |
| Form of addition | Block | Random | Block | Block | Block | Block | Block | Block |
| 1,2-HD | 3 | 3 | 3 | 4 | 4 | 4 | 4 | 4 |
| Glycerin | 10 | 10 | 10 | 10 | 10 | 10 | 10 | 10 |
| TMP | 4 | 4 | 4 | 5 | 5 | 5 | 5 | 5 |
| Olefin E1010 | 0.1 | 0.1 | 0.1 | — | — | — | — | — |
| Surfinol 104 | 0.15 | 0.15 | 0.15 | 0.15 | 0.15 | 0.15 | 0.15 | 0.15 |
| Ion-exchange water | Trace | Trace | Trace | Trace | Trace | Trace | Trace | Trace |

TABLE 5-continued

|  | Composition Example | | | | | | |
| --- | --- | --- | --- | --- | --- | --- | --- |
| Example/Comparative Example | 24 CE 15 | 25 Ex 10 | 26 Ex 11 | 27 CE 16 | 28 CE 17 | 29 CE 18 | 30 CE 19 |
| PB 15:4 | — | — | — | — | — | — | — |
| PBk7 | — | — | — | — | — | — | — |
| PV19 | 5 | — | — | — | — | — | — |
| PY74 | — | 5 | 5 | 5 | 5 | 5 | 5 |
| DEGmBE | 0.3 | — | — | — | — | — | — |
| TEGmBE | 1 | 1 | 1 | 1 | 1 | 1 | 1 |
| PGmBE | — | 0.1 | 0.1 | 0.1 | 0.1 | 0.1 | 0.1 |
| DPGmBE | — | — | — | — | — | — | — |
| BEPD | 0.1 | 0.1 | 0.1 | 0.1 | 0.1 | 0.1 | 0.1 |
| Formula 1 added | 1 | 1 | 1 | 1 | 1 | 1 | 1 |
| Formula 1 R | 9 | 9 | 9 | 9 | 9 | 9 | 9 |
| Formula 1 n | 7 | 7 | 7 | 7 | 7 | 7 | 7 |
| Formula 1 m | 4 | 4 | 4 | 4 | 4 | 4 | 4 |
| Order of addition | R-POEO | R-POEO | R-POEO | R-POEO | R-POEO | R-POEO | R-POEO |
| Form of addition | Block | Block | Block | Block | Block | Block | Block |
| 1,2-HD | 4 | 4 | 4 | 4 | 4 | 4 | 4 |
| Glycerin | 10 | 10 | 10 | 10 | 10 | 10 | 10 |
| TMP | 5 | 5 | 5 | 5 | 5 | 5 | 5 |
| Olefin E1010 | — | — | — | — | — | — | — |
| Surfinol 104 | 0.15 | 0.15 | 0.15 | 0.15 | 0.15 | 0.15 | 0.15 |
| Ion-exchange water | Trace | Trace | Trace | Trace | Trace | Trace | Trace |

TABLE 6

|  | Composition Example | | | | | | | |
| --- | --- | --- | --- | --- | --- | --- | --- | --- |
| Example/Comparative Example | 31 Ex 12 | 32 Ex 13 | 33 Ex 14 | 34 Ex 15 | 35 Ex 16 | 36 Ex 17 | 37 Ex 18 | 38 Ex 19 |
| PB 15:4 | — | — | — | — | — | — | — | — |
| PBk7 | — | — | — | — | — | — | — | — |
| PV19 | 5 | 5 | 5 | 5 | 5 | 5 | 5 | 5 |
| PY74 | — | — | — | — | — | — | — | — |
| DEGmBE | 0.3 | 0.3 | 0.3 | 0.3 | 0.3 | 0.3 | 0.3 | 0.3 |
| TEGmBE | 1 | 1 | 1 | 1 | 1 | 1 | 1 | 1 |
| PGmBE | — | — | — | — | — | — | — | — |
| DPGmBE | — | — | — | — | — | — | — | — |
| BEPD | 0.1 | 0.1 | 0.1 | 0.1 | 0.1 | 0.1 | 0.1 | 0.1 |
| Formula 1 added | 1 | 1 | 1 | 1 | 1 | 1 | 1 | 1 |
| Formula 1 R | 8 | 9 | 9 | 11 | 12 | 9 | 9 | 9 |
| Formula 1 n | 4 | 9 | 6 | 5 | 4 | 7 | 3 | 4 |
| Formula 1 m | 4 | 4 | 5 | 6 | 6 | 4 | 4 | 7 |
| Order of addition | R-POEO | R-POEO | R-POEO | R-POEO | R-POEO | R-POEO | R-POEO | R-EOPO |
| Form of addition | Block | Block | Block | Block | Block | Random | Block | Block |
| 1,2-HD | 4 | 4 | 4 | 4 | 4 | 4 | 4 | 4 |
| Glycerin | 10 | 10 | 10 | 10 | 10 | 10 | 10 | 10 |
| TMP | 5 | 5 | 5 | 5 | 5 | 5 | 5 | 5 |
| Olefin E1010 | — | — | — | — | — | — | — | — |
| Surfinol 104 | 0.15 | 0.15 | 0.15 | 0.15 | 0.15 | 0.15 | 0.15 | 0.15 |
| Ion-exchange water | Trace | Trace | Trace | Trace | Trace | Trace | Trace | Trace |

|  | Composition Example | | | | | | |
| --- | --- | --- | --- | --- | --- | --- | --- |
| Example/Comparative Example | 39 Ex 20 | 40 CE 20 | 41 CE 21 | 42 CE 22 | 43 CE 23 | 44 CE 24 | 45 CE 25 |
| PB 15:4 | — | — | — | — | — | — | — |
| PBk7 | — | — | — | — | — | — | — |
| PV19 | 5 | 5 | 5 | 5 | 5 | 5 | 5 |
| PY74 | — | — | — | — | — | — | — |
| DEGmBE | 0.3 | 0.3 | 0.3 | 0.3 | 0.3 | 0.3 | 0.3 |
| TEGmBE | 1 | 1 | 1 | 1 | 1 | 1 | 1 |
| PGmBE | — | — | — | — | — | — | — |
| DPGmBE | — | — | — | — | — | — | — |
| BEPD | 0.1 | 0.1 | 0.1 | 0.1 | 0.1 | 0.1 | 0.1 |
| Formula 1 added | 1 | 1 | 1 | 1 | 1 | 1 | 1 |
| Formula 1 R | 12 | 6 | 20 | 9 | 9 | 20 | 7 |
| Formula 1 n | 7 | 4 | 7 | 2 | 13 | 10 | 10 |
| Formula 1 m | 6 | 4 | 20 | 8 | 20 | 20 | 20 |

TABLE 6-continued

| Order of addition | R-POEO | R-POEO | R-POEO | R-POEO | R-POEO | R-POEO | R-POEO |
|---|---|---|---|---|---|---|---|
| Form of addition | Block | Block | Block | Block | Block | Block | Block |
| 1,2-HD | 4 | 4 | 4 | 4 | 4 | 4 | 4 |
| Glycerin | 10 | 10 | 10 | 10 | 10 | 10 | 10 |
| TMP | 5 | 5 | 5 | 5 | 5 | 5 | 5 |
| Olefin E1010 | — | — | — | — | — | — | — |
| Surfinol 104 | 0.15 | 0.15 | 0.15 | 0.15 | 0.15 | 0.15 | 0.15 |
| Ion-exchange water | Trace | Trace | Trace | Trace | Trace | Trace | Trace |

The abbreviations in Tables 1 through 3 and 4 through 6 are defined as follows.

| | |
|---|---|
| BZA | Benzylacrylate |
| BZMA | Benzyl methacrylate |
| CHA: | Cyclohexyl acrylate |
| CHMA: | Cyclohexyl methacrylate |
| AA | Acrylic acid |
| MAA | Methacrylic acid |
| BPEH | t-butylperoxy (2-ethylhexanoate) |
| PBk7: | C.I. pigment black 7 (carbon black) |
| PB15:4: | C.I. pigment blue 15:4 (copper phthalocyanine) |
| PV19: | C.I. pigment violet 19 (quinacridone) |
| PY74: | C.I. pigment yellow 74 (condensed azo) |
| DEGmBE: | Diethylene glycol monobutyl ether |
| TEGmBE: | Triethylene glycol monobutyl ether |
| PGmBE: | Propylene glycol monobutyl ether |
| DPGmBE: | Dipropylene glycol monobutyl ether |
| BEPD: | 2-butyl-2-ethyl-1,3-propanediol |
| 1,2-HD: | 1,2 hexanediol |
| TMP: | Trimethylolpropane |

In Tables 1 through 3, BZA, BZMA, CHA, CHMA, AA, MAA, BPEH, PBk7, PB15:4, PV19 and Spy 74 are given as parts by weight. Weight percentages for each component are given in Tables 4 through 6. In Tables 4 through 6, R is the number of carbon atoms in the alkyl group, n is the number of moles of propyleneoxy added, and m is the number of moles of ethyleneoxy added. The order of addition is R-POEO if the propyleneoxy PO is added first to the alkanol R and R-EOPO if the ethyleneoxy EO is added first to the alkanol R, and the form of addition indicates whether the propyleneoxy PO and ethylenoxy EO are added to the alkanol R in blocks or randomly.

As shown by the results of Tables 1 through 3 and Tables 4 through 6, good results were obtained in all of Evaluation Tests 1 through 5 using the inkjet inks of Examples 1 through 11, while good results were not obtained in one or more of Evaluation Tests 1 through 5 using the inkjet inks of Comparative Examples 1 through 19.

What is claimed is:

1. An inkjet recording ink comprising water, a pigment dispersed using a polymer having an acid value of at least 50 mg KOH/g but not more than 200 mg KOH/g and a weight-average molecular weight of at least 20,000 but not more than 120,000, along with an addition product of polyoxypropylene and polyoxyethylene with an alkyl alcohol having 8 to 16 carbon atoms, wherein an added amount of polyoxypropylene is greater than an added amount of polyoxyethylene, and wherein the polymer is polymerized between at least one acid selected from acrylic acid and methacrylic acid, and at least one component selected from the group consisting of benzyl acrylate, benzyl methacrylate, cyclohexyl acrylate and cyclohexyl methacrylate, wherein the acid is in the amount of 15 wt % or less.

2. The inkjet recording ink according to claim 1, wherein the addition product has a molecular weight of 400 or more.

3. The inkjet recording ink according to claim 1, wherein the addition product is added to the ink in an amount of at least 0.01 wt % but not more than 5 wt %.

4. The inkjet recording ink according to claim 1, further comprising at least 0.05 wt % but not more than 1 wt % of one or more components selected from 2,4,7,9-tetramethyl-5-decyn-4,7-diol and 2,4,7,9-tetramethyl-5-decyn-4,7-diol alkylene oxide addition products.

5. The inkjet recording ink according to claim 1, further comprising 1,2-alkylene glycol.

6. The inkjet ink recording ink according to claim 1, further comprising one or more components selected from di(tri) ethylene glycol monobutyl ether and (di)propylene glycol monobutyl ether.

7. The inkjet recording ink according to claim 1, further comprising 2-butyl-2-ethyl-1,3-propanediol.

* * * * *